United States Patent Office 2,722,400
Patented Nov. 1, 1955

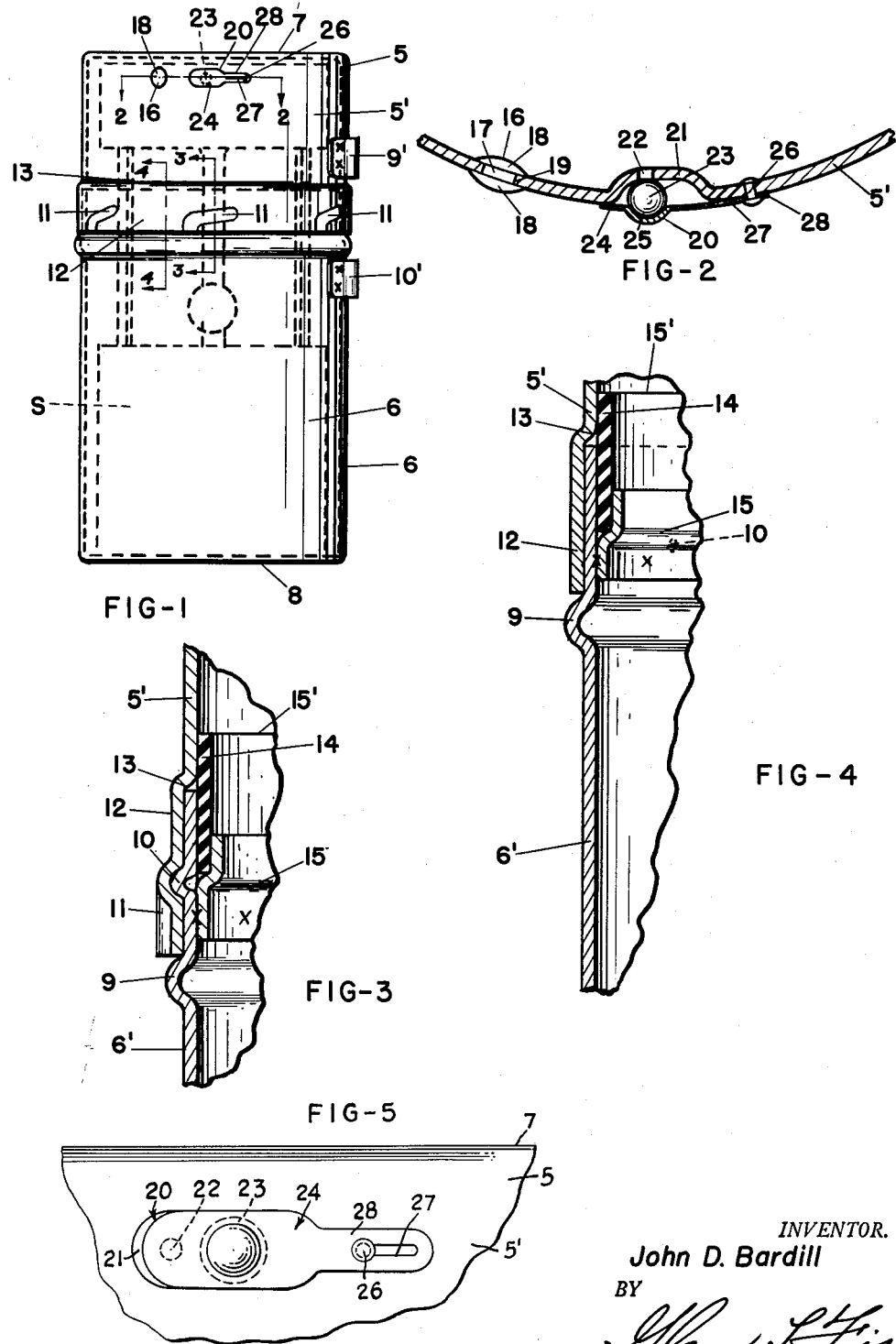

2,722,400

MANUALLY AND FLUID PRESSURE OPERATED RELEASE VALVE

John D. Bardill, Spokane, Wash.

Application July 13, 1951, Serial No. 236,630

4 Claims. (Cl. 251—176)

This invention is a release valve and has for one object the provision of a release valve which is particularly adapted for use with pressure cooking utensils although it is not limited thereto.

Another object of the invention lies in the provision of a yieldable valve adapted to seat over a vent and which is shiftable to permit escape of steam when the internal pressure reaches a predetermined level.

Another object of the invention lies in the provision of the pressure release valve with a spring having a saddle or socket adapted to hold a seating ball and a longitudinal groove adapting the ball to be shifted circumferentially of the side wall of the top and out of covering relation with the vent hole to permit escape of the internal pressure when it is desired to remove the cover from the body.

Another object of the invention lies in the provision of a relief valve for a portable pressure cooker which is simple and inexpensive to manufacture and may be constructed with a minimum number of parts which when assembled form a unit which is not liable to get out of proper working condition.

These and other objects of the invention will be apparent during the course of the following description.

In the accompanying drawings, forming a part of this specification, and in which like numerals are employed to designate like parts, Figure 1 is a side elevation of the invention in its assembled form, Figure 2 is a fragmentary transverse cross section as at line 2—2 of Figure 1, Figure 3 is a fragmentary vertical cross section as at line 3—3 of Figure 1, Figure 4 is a fragmentary vertical cross section as at line 4—4 of Figure 1, and Figure 5 is a plan view of the spring forming a part of the valve.

My invention is particularly adapted to be used with a portable pressure cooking utensil designed with a cover 5 and a body 6 which are circular in plan and have side walls 5' and 6' and top and bottom end walls 7 and 8. The assembled utensil is of such dimensions that it will contain a compact gas operated stove S as shown by dotted lines in Figure 1, and the stove is provided with a wrench (not shown) having a right angle end portion adapted to slip under straps 9' and 10' and form a handle for lifting the cover 5 and body 6 when using the utensil.

Spaced downwardly from its upward open end, the body is provided with a circumferentially extending expressed bead 9 and midway between the bead and said upper end, the body is provided with circumferentially spaced expressed lugs 10 adapted to cooperate with the circumferentially spaced bayonet expressions 11 formed in the skirt 12 constituting a downward projection of the side wall 5' adjacent the open lower end of the cover 5. The skirt is of a greater diameter than the balance of the cover to permit its telescoping over the upper end of body 6 and is defined on the upper edge by a ridge or shoulder 13.

Bead 9 and shoulder 13 cooperate to limit the downward movement of the cover 5 over the body 6 while the bayonet expressions 11 slide over the lugs 10 and rotation of the cover causes the utensil to be secured in position for cooking.

To seal the joint where the cover and body meet, I have provided a resilient sealing ring 14 which extends circumferentially within the open upper end of body 6. The body of the ring 14 is of such width as to permit its being secured in clamping flange 15 welded or otherwise secured in said body, and have its upper edge 15' extending above the upper end of body 6 so that the ring will be positioned in covering relation to the opening between the adjoining cover and body.

The cover 5 is provided with a blow-out plug 16 of rubber or similar material and having a circular body 17 terminating with a flanged head 18 at each end. A hole 19 is drilled in the side wall 5' and the plug forced therein with the heads positioned one within and one without the cover 5.

A pressure release valve or gauge 20 is provided in the cap and comprises an elongated arcuate depression 21 formed in the side wall 5' of cover 5 and an aperture or vent hole 22 is drilled in the bottom of the depression 21 adjacent one end thereof to provide an escape port for steam and air confined within the utensil. It is desired to permit a predetermined pressure to be created in the utensil for the purpose of more quickly cooking the food placed therein as well as to permit cooking when at an extremely high altitude where water boils with very little heat. To effect this pressure, a ball 23 is provided to seat over the vent hole 22 and a leaf type spring 24 having a socket 25 for receiving the ball 23 is placed over the depression 21 to releasably hold the ball in covering relation to the vent hole 22. A rivet 26 secures the spring 24 to the side wall 5' by passing through the elongated slot 27 in finger 28 of spring 24 with a sliding fit.

Before removing the cover 5 from the body 6, it is necessary that the pressure be released from within the utensil. This may be accomplished by placing the utensil in the cold water of a stream, or if no water is available, the spring and ball may be slid circumferentially of the cover with the rivet 26 traversing slot 27 and thus move ball 23 out of covering relation with vent hole 22. The pressure will thus be released and the cover may be removed.

It will be noted that the spring 24 may be of any desired resilience to provide the desired pressure within the utensil and will maintain the pressure at the predetermined level.

The cover may be used as a cup or bowl since the weight of the contents will not be great enough to create pressure capable of moving valve ball 23 from its seat and the cup will thus serve adequately for the purpose. It will also be noted that the embodyment avoids any external appurtenances which are apt to make it difficult to pack the utensil when compactness is desired.

Having thus described my invention, I claim:

1. A pressure release device comprising in combination, a container adapted to contain fluid under pressure; an elongated external depression in the container and having a vent hole communicating the interior and the exterior of the container; an elongated leaf spring having means slidably securing the spring on the outer side face of said container for longitudinal movement longitudinally of said depression and having a portion disposed in covering relation to at least a portion of said depression, said longitudinal movement being responsive to applied manual pressure; and a pressure sensitive spherical seating element urged by said spring to close said vent, said spring having means gripping the sphere, whereby the sphere will shift into and out of seating engagement with said vent by said manual movement and is yieldably movable away from said vent axially thereof by means of fluid under pressure in said vent hole.

2. The invention as defined in claim 1 wherein the spring securing means comprises an elongated slot in the spring and a rivet having a head extending loosely through the slot and secured to the container.

3. A pressure release device comprising a support having an elongated external depression provided with a vent hole therethrough; a leaf spring having a portion disposed in covering relation to at least a portion of said depression and having means securing the spring for manual non-flexing movement longitudinally of said depression; a socket in the portion of said spring covering said depression; a pressure sensitive spherical seating element gripped by said spring in said socket and movable with said spring into and out of seating engagement with said vent longitudinally of said depression by said manual movement, and flexibly movable away from said vent axially thereof by means of fluid under pressure in said vent hole.

4. A pressure release device comprising a support having a vent hole therethrough; a pressure sensitive seating element normally disposed in seating relation to said vent; and a resilient member having means slidably securing it to a side face of said support and said seating element and engaging said element for urging said element into seating engagement with said vent; said means mounting said resilient member and sealing element for manual movement along the support face away from said vent and flexibly movable away from said vent axially thereof by means of fluid under pressure in the vent hole.

References Cited in the file of this patent

UNITED STATES PATENTS

| | | |
|---|---|---|
| 629,140 | Vollkommer | July 18, 1899 |
| 904,662 | Wells | Nov. 24, 1908 |
| 1,065,552 | Russ | June 24, 1913 |
| 1,588,046 | Nelson | June 8, 1926 |
| 1,915,490 | Gere | June 27, 1933 |
| 1,981,864 | Hothersall | Nov. 27, 1934 |
| 2,226,022 | Shutts | Dec. 24, 1940 |
| 2,254,570 | Hailey | Sept. 2, 1941 |
| 2,301,724 | Vischer, Jr. | Nov. 10, 1942 |
| 2,429,149 | Wittenberg | Oct. 14, 1947 |
| 2,516,202 | Graham | July 25, 1950 |

FOREIGN PATENTS

| | | |
|---|---|---|
| 13,151 | Great Britain | July 6, 1894 |
| 235,966 | Great Britain | June 29, 1925 |